United States Patent Office 3,177,225
Patented Apr. 6, 1965

3,177,225
1,2,3,4,5,6-HEXACHLORO-7-NITRONAPHTHALENE AND CERTAIN DERIVATIVES THEREOF
Joseph G. E. Fenyes, Berkeley, Calif., assignor to Fundamental Research Company, Berkeley, Calif., a partnership
No Drawing. Filed June 26, 1962, Ser. No. 205,191
14 Claims. (Cl. 260—326)

This invention relates to naphthalene chemistry. It is concerned more particularly with polychlorinated substituted naphthalenes and, most specifically, with 1,2,3,4,5,6-hexachloro-7-nitronaphthalene and certain of its derivatives and with processes for producing this completely new and useful family of compounds.

These new compounds and methods of producing them therefore constitute the principal objects of the invention.

While the polychlorination of naphthalene itself is old in the art, the chlorination of substituted naphthalenes, when attempted heretofore, has led to disruption of the naphthalene aromatic system, generally with quinone or quinonoid bond formation. Thus, beta-naphthol cannot be chlorinated, in a manner analogous to phenol, to form polychloro-beta-naphthol; instead, a beta-quinonoid system results. In consequence, highly chlorinated beta-naphthol and its related compounds have never been hitherto available.

I have now made the surprising discovery that the polychloro-beta-naphthol system can be quite readily approached indirectly, through the chlorination of 2-nitro-naphthalene with elementary chlorine. Very interestingly, however, I have found that, when 2-nitronaphthalene is chlorinated exhaustively, not all the remaining positions on the naphthalene rings are available for substitution; the alpha position adjacent to the nitro group remains unattacked, and chlorination ceases when 1,2,3,4,5,6-hexachloro-7-nitronaphthalene is formed.

I have further found the nitro group of the forementioned hexachloro-7-nitronaphthalene to be quite labile in the presence of heated alcoholic alkali, such as sodium or potassium hydroxide, ethoxide or methoxide, and that, for example, 1,2,3,4,5,6-hexachloro-7-methoxynaphthalene is readily formed in good yield and purity. The 7-methoxy-compound is relatively resistant to cleavage by most ether-cleaving reagents, such as 48 percent hydrobromic acid and 60 percent sulfuric acid, but it is attacked successfully by anhydrous aluminum chloride with the formation of the desired 1,2,3,4,5,6-hexachloro-7-naphthol.

1,2,3,4,5,6-hexachloro-7-naphthol, for which the corresponding beta-nitro- and methoxy-compounds may properly be considered intermediates, is a versatile and useful compound having marked bactericidal, fungicidal, plasticizing and flame-proofing properties, and in addition, serving as an intermediate in the preparation of still other compounds such as, for example, the aliphatic acid esters which are useful as plant growth regulators.

1,2,3,4,5,6-hexachloro-7-nitronaphthalene is also useful as an intermediate in the preparation of 1,2,3,4,5,6-hexachloro-7-naphthyl-phthalimide, the latter compound having plant growth regulator properties also. For this preparation the nitro compound is reduced to the corresponding naphthylamine, which in turn is treacted with phthalic anhydride to yield the phthalimide.

In addition to the specific properties and utility of the several compounds described above, all of the compounds may be considered as intermediates in the production of naphthalene-base azo dyes of superior quality, particularly with respect to brightness and fastness toward bleach due to the high degree of chlorination.

The examples given below for purposes of illustration will facilitate understanding of the principles and practice of the invention without, however, limiting its scope.

EXAMPLE I

*Preparation of 1,2,3,4,5,6-hexachloro-7-nitronaphthalene*

(a) *Using tetrachloroethane as the solvent.*—Twenty-five parts by weight of 2-nitronaphthalene prepared by the process described in the Hyman and Silverman U.S. Patent No. 2,658,913 were dissolved in 160 parts of dry tetrachloroethane. Approximately 0.5 part of iron powder and 0.5 part of anhydrous ferric chloride were added as catalysts. The solution was heated to and maintained at a temperature of 95–105° C., at which temperature chlorine gas was passed into the liquid. Anhydrous conditions were maintained during the chlorination. Chlorination was carried out for two and a half hours, at the end of which period abundant precipitation had occurred with the formation of a thick slurry. The reaction mixture was then allowed to cool to room temperature, filtered and the filter-cake washed with 100 parts od cold methanol. After evaporating off the methanol, the filter-cake, composed of light yellow crystalline needles, was examined by infra-red and nuclear magnetic resonance spectroscopy, chlorine analysis, and molecular weight determination (by the "osmometer method") and found to be pure 1,2,3,4,5,6-hexachloro-7-nitronaphthalene with a melting point of 188° C. The yield was 76.1 percent of the theoretical based on the weight of 2-nitronaphthalene employed in the preparation. Calculated for $$C_{10}HCl_6O_2N$$

Mol. wt. 379.85. Found: 376±7. Calculated for $C_{10}HCl_6O_2N$: Chlorine 55.9%. Found: 55.4%.

The chlorination period may be varied from about two to about four hours.

(b) *Using carbon tetrachloride as the solvent.*—A mixture of five parts by weight of 2-nitronaphthalene and 0.2 part by weight of anhydrous ferric chloride was dissolved in one hundred parts by weight of dry carbon tetrachloride, and the solution treated at 65°–70° C. with a stream of dry chlorine gas which bubbled through the solution. Toward the end of the reaction, which lasted for approximately 2½ hours, a voluminous precipitate formed. The mixture was then poured into 200 parts by weight of 5% hydrochloric acid, the carbon tetrachloride was boiled away, and the precipitated solids filtered off. These solids, which comprised the crude product were taken up in sufficient hot glacial acetic acid to effect solution, treated with 0.2 part by weight of decolorizing carbon, filtered while still hot, and cooled to about 10° C. A pale yellow product consisting of good quality 1,2,3,4,5,6-hexachloro-7-nitronaphthalene crystallized from solution. It was washed with water repeatedly, and dried. Melting point: 185.5° C. Yield: 91% of the theoretical.

(c) *Using titanium tetrachloride as the solvent.*—A mixture of 5 parts by weight of 2-nitronaphthalene and 0.2 part by weight of anhydrous ferric chloride was dissolved in 100 parts by weight of liquid titanium tetrachloride, and treated at 95°–105° C. with a stream of dry chlorine gas which bubbled through the solution. Samples were taken at 30 minute intervals, until, after 4½ hours the I.R. analysis indicated the reaction to be almost complete. The solvent was then distilled off under reduced pressure (20 mm. Hg), and the solid residue ground, washed repeatedly with hot water, dried and finally recrystallized from hot glacial acetic acid. Yield: 84% of the theoretical weight of 1,2,3,4,5,6-hexachloro-7-naphthalene.

(d) *Chlorination of molten 2-nitronaphthalene.*—A mixture of ten parts by weight of 2-nitronaphthalene and 0.2 part by weight of anhydrous ferric chloride was melted, and held at 95°–105° C. Dry chlorine gas was introduced, and as chlorination proceeded and solids formed the temperature of the melt was gradually raised to 165°–170° C. over a period of about 3 hours, at which time I.R. analysis of a sample indicated chlorination to be nearly complete and the reaction had gained twelve parts by weight through substitution of chlorine for hydrogen. The crude product thus formed was cooled and ground, and recrystallized from glacial acetic acid. M.P.: 183°–184° C. Yield: 82% of the theoretical weight of 1,2,3,4,5,6,-hexachloro-7-nitronaphthalene.

EXAMPLE II

*Preparation of 1,2,3,4,5,6-hexachloro-7-methoxynaphthalene*

A solution containing approximately 7.3 percent sodium methoxide in methanol was prepared by dissolving 150 parts by weight of sodium methoxide in 2060 parts of methanol. One hundred and six parts of 1,2,3,4,5,6-hexachloro-7-nitronaphthalene, prepared as in Example I, were added to the solution and the resulting suspension was heated at reflux temperature (about 65° C.) with constant stirring, for one and a half hours. At the end of this period the orange yellow reaction mixture was cooled to room temperature and filtered. The filter-cake was washed twice, each time with 160 parts of methanol. After evaporating off the methanol, the dried product consisted of 90.5 parts of pure 1,2,3,4,5,6-hexachloro-7-methoxynaphthalene, a yield of 89.5 percent of the theoretical. The identity of the compound was established by infra-red spectroscopic examination, chlorine analysis, and molecular weight determination by the "osmometer method." The melting point of the compound was about 185° C., above which it turned into a viscous liquid. The compound crystallized from methanol in the form of whitish crystalline needles, from acetic acid as light yellow crystalline needles, and from carbon disulfide as white crystals. Calculated for $C_{10}H_4Cl_6O$: mol. wt. 364.9. Found: 361±5. Calculated for $C_{10}H_4Cl_6O$: chlorine 58.3%. Found: 58.4%.

EXAMPLE III

*Alternative preparation of 1,2,3,4,5,6-hexachloro-7-methoxynaphthalene*

To a solution of 7 parts by weight of sodium hydroxide in 79 parts of methanol was added 5 parts of 1,2,3,4,5,6-hexachloro-7-nitronaphthalene prepared according to the procedure of Example I. This suspension was stirred and refluxed at about 65° C. for 30 minutes. At the end of this period the reaction mixture was filtered, and the filter-cake washed with water and then dried. The dried product was shown by infra-red examination to be 1,2,3,4,5,6-hexachloro-7-methoxynaphthalene.

EXAMPLE IV

*Preparation of 1,2,3,4,5,6-hexachloro-7-ethoxynaphthalene*

An approximately 10 percent solution of sodium ethoxide was prepared by dissolving 3.4 parts by weight of metallic sodium in 78.5 parts of ethanol. To this solution were added 5.0 parts of 1,2,3,4,5,6-hexachloro-7-nitronaphthalene. The resulting suspension was heated to 65° C. with stirring for 30 minutes. At the end of this time the reaction mixture was filtered. The insoluble fraction was unchanged starting material. The filtrate was diluted with 200 parts of water. The precipitate which formed was filtered off, washed with water, and dried. Infra-red spectroscopic examination of the dried product showed it to be 1,2,3,4,5,6-hexachloro-7-ethoxynaphthalene.

EXAMPLE V

*Preparation of 1,2,3,4,5,6-hexachloro-7-naphthol*

(a) *Using tetrachloroethane as the solvent.*—Two parts by weight 1,2,3,4,4,6,-hexachloro-7-methoxynaphthalene prepared by the procedure of Examples II or III were dissolved in 80 parts of dry tetrachloroethane. To this solution was added 0.8 part of anhydrous aluminum chloride and the mixture refluxed at about 146° C. for eighty minutes. The resulting dark solution was poured into 150 parts of vigorously stirred 5 percent aqueous hydrochloric acid. The aqueous layer was separated with a separatory funnel and discarded. The organic layer was steam-distilled to remove the tetrachloroethane solvent, resulting in an aqueous suspension of the crude product. The solids were filtered off, and recrystallized from 89–90 percent methanol. After evaporating off the methanol the dried product was found to be 1,2,3,4,5,6-hexachloro-7-naphthol, the identity being established by infra-red examination, chlorine analysis and molecular weight determination. The compound crystallized from methanol as grayish-white crystalline needles with a melting point of about 170° C., at which it formed a clear viscous liquid. The yield obtained was 76 percent of the theoretical.

(b) *Using benzene as the solvent.*—Thirty parts by weight of 1,2,3,4,5,6-hexachloro-7-methoxynaphthalene were dissolved in 440 parts of dry benzene. To this solution 16 parts of anhydrous aluminum chloride were added, and the mixture refluxed at about 80° C. for a total of fifteen hours. The resulting dark solution was stirred into 1000 parts of ice-cold 5 percent aqueous hydrochloric acid. The aqueous layer was separated and discarded. The benzene was expelled from the organic layer by azeotropic distillation. The resulting aqueous suspension was filtered, and the remaining solids washed with water and recrystallized as above from 80–90 percent methanol. The dried product, freed from methanol, was again found to be 1,2,3,4,5,6-hexachloro-7-naphthol, the identity being established as before by infra-red examination, chlorine analysis and molecular weight determination. The yield obtained in this case was 77 percent of the theoretical.

EXAMPLE VI

*Preparation of 1,2,3,4,5,6-hexachloro-7-naphthylamine*

The amine was prepared by reduction of the nitro compound in the following manner: Ten parts by weight of 1,2,3,4,5,6-hexachloro-7-nitronaphthalene prepared by the procedure of Example I were refluxed with stirring for 18 hours at about 95° C. in a mixture of 81.4 parts of n-amyl alcohol and 138 parts of 20 percent aqueous sodium bisulfite solution. This was a two-phase system in which the starting nitronaphthalene material was not completely soluble even at reflux temperature. At the end of the reflux period the reaction mixture was cooled to room temperature and filtered. The filter-cake was washed with hot water to remove traces of amyl alcohol and then dried. The dried product was found to be 1,2,3,4,5,6-hexachloro-7-naphthylamine, the identity being established by infra-red spectroscopy. The compound is a greenish-gray solid with a melting point above 165° C. The yield obtained was 8.5 parts by weight, equivalent to 92.2 percent of the theoretical.

EXAMPLE VII

*Preparation of 1,2,3,4,5,6-hexachloro-7-naphthyl-phthalimide*

An intimate mixture of 5.0 parts of 1,2,3,4,5,6-hexachloro-7-naphthylamine prepared as in Example VI and 4.0 parts of phthalic anhydride was heated in a round-bottom flask at between 200 and 250° C. for a period of 30 minutes. Such phthalic anhydride as sublimed was scraped back periodically during the heating. On cooling the reaction mixture to room temperature, a dark-brown brittle substance was recovered. This was powdered and freed from unreacted phthalic anhydride by two washes, each with 40 parts of hot methanol. The residual dried product, after removal of methanol, was found to be 1,2,3,4,5,6-hexachloro-7-naphthyl-phthalimide, the identity being established by infra-red examination. The compound is a yellow crystalline powder. The yield of product obtained was 5.0 parts by weight, equivalent to 72.9 percent of the theoretical. Calculated for $C_{18}H_5Cl_6O_2N$: Chlorine 44.3%. Found: 43.4±0.7%. Mol. wt. 480. Found: 496.

From the foregoing discussion and examples it is evident that my invention makes available for the first time a new class of naphthalene derivatives having the general structural formula:

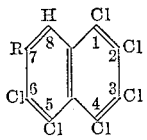

in which R may be nitro, methoxy, ethoxy, hydroxy, amino or phthalimide group.

It is also evident that the processes set forth in the specification, while straightforward and unambiguous, are subject to numerous modifications in detail which will naturally occur to one skilled in the art.

Thus, for example, instead of the anhydrous ferric chloride and iron used as chlorination catalysts in Example I other known chlorination catalysts, such as anhydrous aluminum chloride or iodine may be successfully employed. Solvents other than those mentioned in connection with Example I such as, for example, methyl chloroform or 1,2-di-chlor-propane, may be employed.

The methanol solution of alkali metal methoxide employed in Example II may be replaced with an ethanolic solution of alkali metal ethoxide with consequent formation of the corresponding ethoxy derivative.

Other organic solvents may obviously be used instead of some of those shown in the examples, due cognizance being taken of the effect of differences in boiling point, etc. on the time and temperature of the reaction.

Again, in the preparation of the naphthyl-phthalimide described in Example VII, loss of phthalic anhydride by sublimation may be minimized by carrying out the reaction in closed or pressure vessels.

All such modifications of the invention are deemed to be comprehended within its scope as defined in the claims.

I claim:

1. A polychlorinated naphthalene derivative having the structure formula:

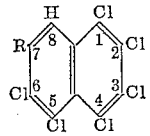

wherein R is a member of the class consisting of nitro, methoxy, ethoxy, hydroxy, amino and phthalimide groups.

2. 1,2,3,4,5,6-hexachloro-7-nitronaphthalene.
3. 1,2,3,4,5,6-hexachloro-7-methoxynaphthalene.
4. 1,2,3,4,5,6-hexachloro-7-naphthol.
5. 1,2,3,4,5,6-hexachloro-7-naphthylamine.
6. 1,2,3,4,5,6-hexachloro-7-naphthyl-phthalimide.
7. A process for preparing 1,2,3,4,5,6-hexachloro-7-nitronaphthalene which comprises exhaustively chlorinating 2-nitronaphthalene with elementary chlorine in the presence of a chlorination catalyst.
8. A process according to claim 7 in which the chlorination is carried out in a tetrachloroethane solution of 2-nitronaphthalene with gaseous chlorine at a temperature of about 95 to 105° C. for a period of from about 2 to about 4 hours.
9. A process for preparing 1,2,3,4,5,6-hexachloro-7-methoxynaphthalene which comprises treating 1,2,3,4,5,6-hexachloro-7-nitronaphthalene with a methanolic solution of an alkali taken from the class consisting of sodium methoxide, potassium methoxide, sodium hydroxide and potassium hydroxide, whereby the nitro group is replaced with a methoxy group.
10. A process for preparing 1,2,3,4,5,6-hexachloro-7-ethoxynaphthalene which comprises treating 1,2,3,4,5,6-hexachloro-7-nitronaphthalene with an ethanolic solution of sodium ethoxide, potassium ethoxide, sodium hydroxide, and potassium hydroxide, whereby the nitro group is replaced with an ethoxy group.
11. A process for preparing 1,2,3,4,5,6-hexachloro-7-naphthol which comprises treating a compound of the class consisting of 1,2,3,4,5,6-hexachloro-7-methoxynaphthalene and 1,2,3,4,5,6-hexachloro-7-ethoxynaphthalene with anhydrous aluminum chloride whereby the 7-position group is replaced with an hydroxy group.
12. A process for preparing 1,2,3,4,5,6-hexachloro-7-naphthylamine which comprises treating 1,2,3,4,5,6-hexachloro-7-nitronaphthalene with an aqueous solution of sodium bisulfite whereby the nitro group is converted to an amino group.
13. A process for preparing 1,2,3,4,5,6-hexachloro-7-naphthyl-phthalimide which comprises treating 1,2,3,4,5,6-hexachloro-7-nitronaphthalene with a reducing agent to convert the nitro group to an amino group and treating the resulting amino compound with phthalic anhydride whereby the amino group is converted to a phthalimide group.
14. 1,2,3,4,5,6-hexachloro-7-ethoxynaphthalene.

References Cited by the Examiner

FOREIGN PATENTS 565,945    9/48    Belgium.

CARL D. QUARFORTH, *Primary Examiner.*

DUVALL McCUTCHEN, REUBEN EPSTEIN,
*Examiners.*